(12) United States Patent
Lang et al.

(10) Patent No.: US 11,581,784 B2
(45) Date of Patent: Feb. 14, 2023

(54) HEAT SINK FOR AN ELECTRIC MACHINE

(71) Applicant: ZF Friedrichshafen AG, Friedrichshafen (DE)

(72) Inventors: Martin Lang, Wegscheid (DE); Thomas Auer, Passau (DE); Sebastian Paulik, Tiefenbach (DE); Harald Wendl, Vilshofen (DE); Gerhard Obermaier, Tiefenbach (DE); Maria Lang, Hauzenberg (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 119 days.

(21) Appl. No.: 16/894,155

(22) Filed: Jun. 5, 2020

(65) Prior Publication Data
US 2020/0389067 A1 Dec. 10, 2020

(30) Foreign Application Priority Data
Jun. 6, 2019 (DE) .................... 10 2019 208 297.1

(51) Int. Cl.
*H02K 1/32* (2006.01)
*H02K 9/04* (2006.01)
(Continued)

(52) U.S. Cl.
CPC .................. *H02K 9/04* (2013.01); *H02K 1/20* (2013.01); *H02K 1/32* (2013.01); *H02K 5/203* (2021.01); *H02K 7/09* (2013.01); *H02K 9/19* (2013.01)

(58) Field of Classification Search
CPC .. H02K 9/04; H02K 9/06; H02K 9/19; H02K 9/193; H02K 9/197; H02K 1/20; H02K 1/32; H02K 7/09
(Continued)

(56) References Cited

U.S. PATENT DOCUMENTS 5,698,914 A * 12/1997 Shiga ....................... H02K 9/28
  310/85
7,224,094 B2 * 5/2007 Shimada .................. H02K 7/09
  310/58
(Continued)

FOREIGN PATENT DOCUMENTS

DE         60225725 T2    4/2009
DE     102010013302 A1   10/2010
(Continued)

OTHER PUBLICATIONS

Machine translation of DE-102017214560-A1. (Year: 2019).*
German Search Report DE102019208297.1, dated Feb. 21, 2020. (12 pages).

*Primary Examiner* — Michael Andrews
(74) *Attorney, Agent, or Firm* — Dority & Manning, P.A.

(57) ABSTRACT

A heat sink (30) for cooling an electric machine (10), includes: a first part of the heat sink (32) in the form of a hollow cylinder, wherein an inner lateral surface includes a groove (34) extending helically with respect to a central axis of the hollow cylinder; a second part of the heat sink (36) in the form of a hollow cylinder, which includes a radially internal fin (38); and a third part of the heat sink (40) in the form of a hollow cylinder, which includes a connecting section (52), in order to accommodate an output shaft (12) of the machine in a rotationally fixed manner. The second part of the heat sink is accommodated, at least partially, in the first part of the heat sink, so that a radially external surface of the second part of the heat sink rests against the groove.

15 Claims, 3 Drawing Sheets

(51) Int. Cl.
  *H02K 9/19* (2006.01)
  *H02K 7/09* (2006.01)
  *H02K 1/20* (2006.01)
  *H02K 5/20* (2006.01)

(58) Field of Classification Search
  USPC .................................................. 310/58, 64
  See application file for complete search history.

(56) References Cited

U.S. PATENT DOCUMENTS

2011/0298293 A1* 12/2011 Veltri ...................... H02K 7/09
  310/85
2014/0368064 A1* 12/2014 Fedoseyev ............. H02K 9/225
  310/54

FOREIGN PATENT DOCUMENTS

| DE | 102014205884 A1 | | 10/2015 |
| DE | 102017214560 A1 | * | 2/2019 |
| DE | 102017214560 A1 | | 2/2019 |
| GB | 191416979 | | 7/1915 |
| WO | WO 2010/115539 | | 10/2010 |

* cited by examiner

HEAT SINK FOR AN ELECTRIC MACHINE

CROSS-REFERENCE TO RELATED APPLICATION

The present application is related and has right of priority to German Patent Application No. 10 2019 208 297.1 filed on Jun. 6, 2019, which is incorporated by reference in its entirety for all purposes.

FIELD OF THE INVENTION

The present invention relates generally to a heat sink for an electric machine, an electric machine, and a system for cooling an electric machine.

BACKGROUND

Vehicles are increasingly equipped with hybrid drives or pure electric drives. Hybrid drives can contribute to the reduction of fuel consumption and pollutant emissions. Drive trains including an internal combustion engine and one or multiple electric motors have largely prevailed as a parallel hybrid or as a mixed hybrid. Since the drive torques of the electric drive and of the internal combustion engine can be summed or added up, depending on the actuation, a comparatively smaller design of the internal combustion engine and/or intermittent shut-down of the internal combustion engine is possible. As a result, a significant reduction of the $CO_2$ emissions can be achieved without significant losses of power and/or comfort. Pure electric vehicles can be operated, at times, without significant emissions.

In particular during the utilization of electric machines that can reach very high rotational speeds, for example, in the range of 20,000 revolutions per minute, the components of the electric machines are exposed to enormous loads and high temperatures. It is therefore known to limit the energy supplied to an electric machine, in order to prevent excessive heating and associated damage of the electric machine. As a result, however, the electric machine cannot reach full potential.

Moreover, it is known to cool the electric machine with the aid of cooling fins arranged on a housing of the electric machine or with the aid of a water cooling arranged on the housing. These types of coolings are not very efficient, since the cooling takes place at a great distance from the heat source.

DE 10 2010 013 302 A1 describes an electric motor including a motor housing in which bearings are provided for supporting a rotor shaft. A stator core, on which a stator winding is arranged, is provided in the motor housing. A rotor core rotationally fixed to the rotor shaft is provided in the motor housing. Recesses are provided on the rotor core, which extend from one axial face end of the rotor core to the other axial face end of the rotor core. It is disadvantageous that the recesses are provided in the rotor, which makes a production of the rotor technically complex. Moreover, this type of rotor is less efficient and has a greater radial extension due to the existing recesses. This type of electric motor is suitable only for utilization with a gaseous cooling fluid.

DE 602 25 725 T2 describes a magnetic bearing spindle, which is utilized as a machine tool spindle. The spindle rotates at speeds of up to seventy thousand rotations per minute (70,000 rpm). A circumferential portion of an axial magnetic bearing rotor is designed in a triangular shape, which reduces a variation rate of a pipe resistance or a pipe strength. As a result, it is to be ensured that a vortex is not generated, so that cooling air can gently pass through the gap in such a way that the cooling air can uniformly divide or separate and flow in a load direction and a direction opposite the load direction. It is disadvantageous that the magnetic bearing spindle is cooled exclusively by an air flow. An above-described cooling is not suitable for lower rotational speeds, which are utilized, for example, in electric prime movers for motor vehicles. Moreover, this type of spindle cannot be cooled—or can be cooled only with high technical complexity—with the aid of a liquid cooling fluid.

In general, it is desirable to cool an electric machine as efficiently as possible, in order to minimize a limitation of the energy supplied to the electrical machine. A limitation of the supplied energy is associated with a loss in the efficiency of the electric machine. Various operating modes are provided, particularly in the case of electric machines for motor vehicles. For example, the electric machine can be operated in a recuperation mode. In this mode, a low efficiency of the electric machine results in a loss in the energy recuperation. Therefore, a portion of the practically freely available energy cannot be recuperated and utilized. It is therefore of particular interest to increase the efficiency of an electric machine, in particular of an electric machine for a motor vehicle.

SUMMARY OF THE INVENTION

Against the above background, example aspects of the present invention create a possibility for improving the cooling of an electric machine. In particular, a device is to be created, which allows for a cooling at a close distance to the heat source.

In order to solve this problem, example aspects of the invention provide a heat sink for cooling an electric machine, including:
 a first part of the heat sink in the form of a hollow cylinder, wherein an inner lateral surface includes a groove extending helically with respect to a central axis of the hollow cylinder;
 a second part of the heat sink in the form of a hollow cylinder, which includes a radially internal fin; and
 a third part of the heat sink in the form of a hollow cylinder, which includes a connecting section, in order to accommodate an output shaft of the machine in a rotationally fixed manner, wherein
 the second part of the heat sink is accommodated, at least partially or in sections, in the first part of the heat sink, so that a radially external surface of the second part of the heat sink rests against the groove, in order to seal the groove in a fluid-tight manner and form a helical fluid duct;
 the groove includes an opening at each end of the groove, in order to enable an exchange of a cooling fluid in the fluid duct;
 the second part of the heat sink is designed for being arranged, including the fin, on a radially external surface of the third heat sink, in order to form one further fluid duct; and
 the first part of the heat sink is designed for being arranged on a rotor of the electric machine, so that the heat sink is arranged between the rotor and the output shaft in a rotationally fixed manner, in order to cool the electric machine and the output shaft of the electric machine.

Example aspects of the invention further relates to an electric machine, including:
 a stator;
 a rotor; and an output shaft including an above-described heat sink, wherein the heat sink is rotationally fixed to the rotor of the electric machine and the output shaft.

Moreover, example aspects of the invention relates to a system for cooling an electric machine, including:

a fluid sump for storing a cooling fluid;

an electric machine as described above; and a fluid pump for delivering the cooling fluid in a fluid flow direction from the fluid sump to the heat sink, in order to form a cooling circuit.

It is understood that the features, which are mentioned above and which will be described in greater detail the following, are usable not only in the particular combination indicated, but also in other combinations or alone, without departing from the scope of the present invention. Moreover, it is understood that the features and advantages mentioned here can be utilized with any electric machine, regardless of their intended purpose.

Due to a helically extending groove, which forms a fluid duct together with a radial external surface of the second part of the heat sink, cooling fluid can be guided over a long distance through the electric machine. The cooling of the electric machine with the aid of cooling fluid is efficient. Due to a radially internal fin in a second part of the heat sink, which forms one further fluid duct together with a radially external surface of the third heat sink, an efficient cooling of the electric machine can be achieved. Heat can be dissipated directly out of the interior of the electric machine. The cooling of the electric machine is possible in a technically simple and efficient manner. Due to the arrangement of the heat sink between the rotor and the output shaft of the electric machine, this type of electric machine can be designed in a technically simple manner and with few parts. Due to the utilization of a fluid duct, a high temperature gradient can be achieved between the heat sink and the cooling fluid.

In one preferred example embodiment, the fin is designed to be helical, in order to generate an air flow through the heat sink during the operation of the electric machine. As a result, an air flow can be generated in a technically simple manner. No further components are necessary in order to achieve a ventilation of the electric machine in the interior of the electric machine. A fail-safe system can be created, in order to maintain a residual cooling with the aid of an air flow in the event of a failure of a fluid supply of the groove.

In one preferred example embodiment, the second and third parts of the heat sink each include a bore hole at axial end sections of the second and third parts. A bore hole of the second part of the heat sink is connected to a bore hole of the third part of the heat sink and forms a duct, which extends to the groove, in order to guide cooling fluid to and away from the groove. In this way, an inflow for a cooling fluid to the groove can be achieved in a technically simple manner. The heat sink is radially compact. Preferably, an additional sealing of the inflow to the groove can be dispensed with.

In one advantageous example embodiment, the heat sink is made of metal. Additionally or alternatively, the heat sink is a machined forging. Additionally or alternatively, the first part of the heat sink includes one further groove extending helically with respect to the central axis of the hollow cylinder. Additionally or alternatively as well, the second part of the heat sink includes one further fin. As a result, the production of the heat sink is possible in a technically simple and cost-effective manner. Due to one further groove, the cooling fluid remains within the electric machine for a shorter time. A temperature gradient between the electric machine and the cooling fluid is therefore higher, so that the cooling power is improved. Due to one further fin, the air flow through the heat sink can be improved. Moreover, the heat sink is more stable and can better transmit a torque generated by the electric machine.

In one preferred example embodiment, the third part of the heat sink includes a driving toothing on the connecting section, in order to be rotationally fixed to the output shaft of the electric machine. As a result, a rotationally fixed connection between the heat sink and the output shaft can be created in a cost-effective manner. Moreover, the production of an electric machine including a heat sink is simplified, since the output shaft can be easily inserted or pressed into the heat sink.

In one advantageous example embodiment, the parts of the heat sink are connected to one another with the aid of a press fit, friction welding, and/or bonding. As a result, a rotationally fixed connection between the parts of the heat sink can be created in a cost-effective manner. Moreover, it can be ensured in a technically simple manner that the fluid ducts arising due to the joining of the parts of the heat sink are fluid-tight. The heat sinks can also be sealed at their ends with the aid of an O-ring. Preferably, however, an additional seal of the heat sink can be dispensed with.

In one advantageous example embodiment, the third part of the heat sink has an inner diameter that is greater than an outer diameter of the output shaft of the electric machine. The output shaft of the electric machine, together with the third part of the heat sink, forms a gap, which acts as the outflow for the cooling fluid. As a result, the assembly or the arrangement of the heat sink on the output shaft can be simplified. Moreover, the heat sink can be produced quickly and cost-efficiently, since a precise fit of the heat sink with respect to the output shaft is omitted. Due to the formation of a gap, an outflow for the cooling fluid can be created in a technically simple manner.

In one advantageous example embodiment, the gap opens into a feed line to a fluid sump. Due to the conduction of the cooling fluid into a feed line to a fluid sump, a cooling circuit can be created. Moreover, heated and moving cooling fluid can settle in a fluid sump. Bubbles that may have formed in the cooling fluid can travel upward due to their low density. When the cooling fluid is drawn out of the fluid sump again, with the aid of a fluid pump, and when cooling takes place again, less hydraulic drag and a high cooling power are possible.

In one advantageous example embodiment, a helical shape of the groove is oriented in a main direction of rotation of the electric machine, in order to exert a suction effect onto the cooling fluid in the direction of the gap. As a result, a flow velocity of the cooling fluid in the groove can be accelerated. The cooling becomes more efficient. It is also conceivable to provide a smaller fluid pump, since a lower pump power is already sufficient for creating a cooling circuit. An optimal fluid velocity can be computationally determined in CFD (computational fluid dynamics), wherein slower velocities can also be advantageous, since the fluid then has more time to absorb the heat and the pressure loss is minimized. The direction of rotation in which the electric machine mainly rotates is to be considered the main direction of rotation of the electric machine. For example, the direction of rotation that generates a forward movement of the vehicle. The orientation of the helical shape is such that the helical groove acts upon the cooling fluid in the manner of an Archimedean screw.

In one advantageous example embodiment, the electric machine includes a transmitter wheel, wherein the transmitter wheel is designed for rotating with the output shaft and includes a bore hole, in order to feed cooling fluid through the transmitter wheel to the heat sink. In this way, a monitoring of the rotational speed of the electric machine is possible in a technically simple and reliable manner, wherein a supply of cooling fluid to the heat sink of the electric machine is ensured.

In one advantageous example embodiment, the heat sink is rotationally fixed to the rotor of the electric machine with the aid of a press fit. In this way, a rotationally fixed connection of the heat sink to the rotor of the electric machine can be created in a cost-effective and technically simple manner.

In one advantageous example embodiment, the electric machine is designed for being operatively connected, at the output shaft, to a transmission, and includes a predefined heat sink with a gap, wherein the gap is designed for feeding cooling fluid to the transmission, in order to lubricate and/or cool the transmission. In this way, the operatively connected transmission can be cooled and lubricated in a technically simple manner. Preferably, an additional lubrication and cooling of the transmission can be dispensed with.

In one advantageous example embodiment, the system for cooling the electric machine includes a heat exchanger, in order to withdraw heat from the cooling fluid. The heat exchanger is preferably arranged between the fluid sump and the fluid pump in the direction of fluid flow. In this way, the cooling of the electric machine can be further improved. Additionally, heat can be withdrawn from the cooling fluid.

Cooling fluid is available in many different compositions, depending on the location and the field of application. For example, a mineral oil and/or synthetic oil with or without additives can be utilized. It is also conceivable to utilize water, in particular deionized water, with or without additives. Alcohols or ethers, with or without additives, can also be utilized as cooling fluid. In principle, any gas or any liquid, depending on the intended purpose, can be utilized as cooling fluid. In the present case, a substance that is liquid and/or flowable over the entire temperature range is usable as cooling fluid.

Recuperation is a recuperation of energy during a braking procedure. A recuperation brake, which is also referred to as a regenerative brake, operates in a wear-free manner, as is the case for any electrodynamic brake. The braking effect arises in that the drive motors are operated as electric generators. The electrical energy can be stored in the vehicle, for example, in an accumulator or a supercapacitor.

A transmitter wheel is a device for generating a signal that correlates with the angle position or rotational position of the transmitter wheel. For example, an angle signal or a rotational speed signal can be generated on the basis of periodic gaps in a gear ring or with the aid of an induction-type pulse generator due to the magnetic field changes. A uniform tooth structure corresponds to a sinusoidal voltage profile. Moreover, a certain gearwheel position can be transmitted to a control unit, in that different sized gaps are utilized at certain distances, whereby a change of the voltage profile takes place. An optical determination of the angle position or the rotational speed is also conceivable, for example, with the aid of teeth of a gearwheel, which pass through a light barrier.

Churning losses are efficiency losses that arise when mechanical parts that rotate, for example, shafts, gearwheels, etc., run at least partially in a fluid and this results in a resistance for this mechanical part and, therefore, for the entire unit. This results in adverse effects on the cooling properties of a cooling fluid that arise due to impurities, preferably due to air bubbles. The impurities usually have poorer thermal properties than the cooling fluid, and therefore a contaminated cooling fluid can absorb less heat. Moreover, in the case of a contamination of the cooling fluid via an inclusion of air, the viscosity of the cooling fluid can change, and therefore a fluid pump operates less efficiently.

An inner lateral surface is understood to be, in particular, the radially inward directed or the radially internal surface of the hollow cylinder. A groove is, in particular, an elongate recess. A fin is, in particular, an elongate raised area. "Helical" means, in this case, in particular, the type of a thread, preferably a thread having a constant thread pitch.

BRIEF DESCRIPTION OF THE DRAWINGS

The invention is described and explained in greater detail in the following with reference to a few selected exemplary embodiments in conjunction with the attached drawings. Wherein.

DETAILED DESCRIPTION

Figure 1:
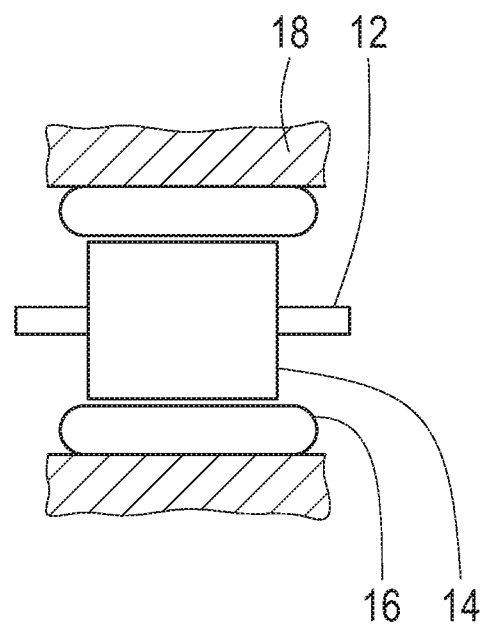
FIG. 1 shows a schematic of an electric machine according to example aspects of the present invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

An electric machine 10 is diagrammatically shown in FIG. 1. The electric machine 10 includes an output shaft 12, which is rotationally fixed to a rotor 14 of the electric machine. A stator 16 of the electric machine 10 is rotationally fixed to a housing 18. It is understood that the stator 16 can also be operatively connected to another component that prevents a turning motion of the stator 16 in relation to the rotor 14. The representation is to be understood as an example; the components are not true to scale. Moreover, a representation of further details has been dispensed with.

During an operation of the electric machine 10, the rotor 14 and the output shaft 12 rotate at the same rotational speed. The stator 16 is connected to the housing 18 in such a way that the stator 16 essentially does not move, in particular does not turn. The electric machine 10 can be, in particular, a direct-current machine, an alternating-current machine, or a three-phase alternating-current machine. In general, the invention can be used with any electric machine that includes an output shaft.

Figure 2:
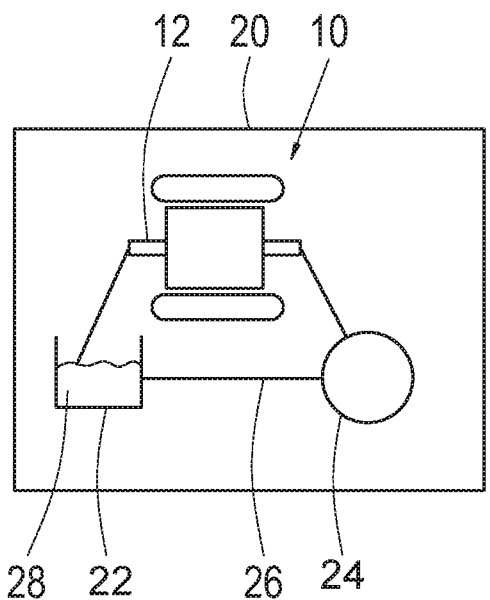
FIG. 2 shows a schematic of a cooling system according to example aspects of the present invention.

A system 20 for cooling the electric machine 10 is diagrammatically shown in FIG. 2. The system 20 includes a fluid sump 22, a fluid pump 24, and lines 26.

The fluid pump 24 delivers cooling fluid 28 out of the fluid sump 22 into the output shaft 12 of the electric machine 10. The cooling fluid 28 absorbs heat from the electric machine 10. Due to further delivery of cooling fluid 28, the cooling fluid 28 is pressed out of the output shaft 12 of the electric machine 10 and flows back into the fluid sump 22.

The fluid pump 24 can be any type of pump that is suitable for delivering cooling fluid. It is understood that one or multiple heat exchangers can be provided in the system 20, in order to cool the cooling fluid 28 in an improved way. In addition, a fluid filter can be provided, in order to filter suspended matter out of the cooling fluid 28. In addition, one or multiple temperature sensors can be provided, in order to measure the temperature of the electric machine 10 and/or the cooling fluid 28. It is conceivable to control, by way of a closed-loop system, the fluid pump 24 depending on the temperature of the electric machine 10 and/or the cooling fluid 28. The representation is to be understood as an operable minimal diagram. Moreover, it is also conceivable that the fluid pump 24 operates one further cooling circuit.

Figure 3:
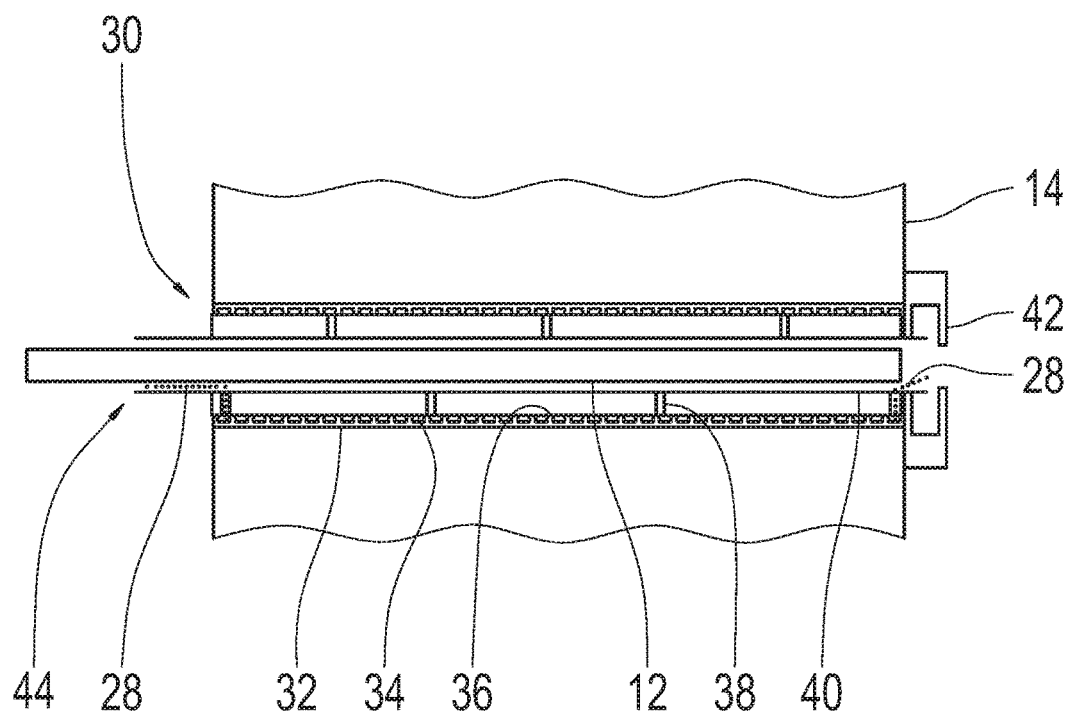
FIG. 3 shows a detailed schematic of the electric machine including a heat sink.

FIG. 3 shows a detailed schematic of the electric machine 10 including a heat sink 30. The heat sink 30 includes a first part of the heat sink 32 with a helically extending groove 34. The first part of the heat sink 32 is accommodated in a second part of the heat sink 36 in such a way that a radially external surface (lateral surface) of the second part of the heat sink closes the grooves 34 of the first part of the heat sink 32 in a fluid-tight manner. In the example shown, the second part of the heat sink 36 also includes helically extending fins 38 and is accommodated in a third part of the heat sink 40 in such a way that the fins 38 rest, in a fluid-tight manner, against a radially external surface of the third part of the heat sink 40.

Moreover, the heat sink 30 includes a transmitter wheel 42, which is rotationally fixed to the heat sink 30 and includes a bore hole or recess, through which the cooling fluid 28 is feedable to the heat sink 30. The cooling fluid 28 flows through a bore hole in the third part of the heat sink 40 and a bore hole through a fin 38 of the second part of the heat sink 36 into the groove 34 of the first part of the heat sink 32.

On the axial side of the heat sink 30 positioned opposite the transmitter wheel, the third part of the heat sink 40 forms, together with the output shaft 12, a gap 44, which acts as the outflow for the cooling fluid 28. The cooling fluid also flows through a bore hole in a fin 38 of the second part of the heat sink 36 and a bore hole in the third part of the heat sink 40 into a gap between the heat sink 30 and the output shaft 12. In FIG. 3 shown, the path of the cooling fluid is indicated, at least in sections, by dashed lines.

Figure 4:
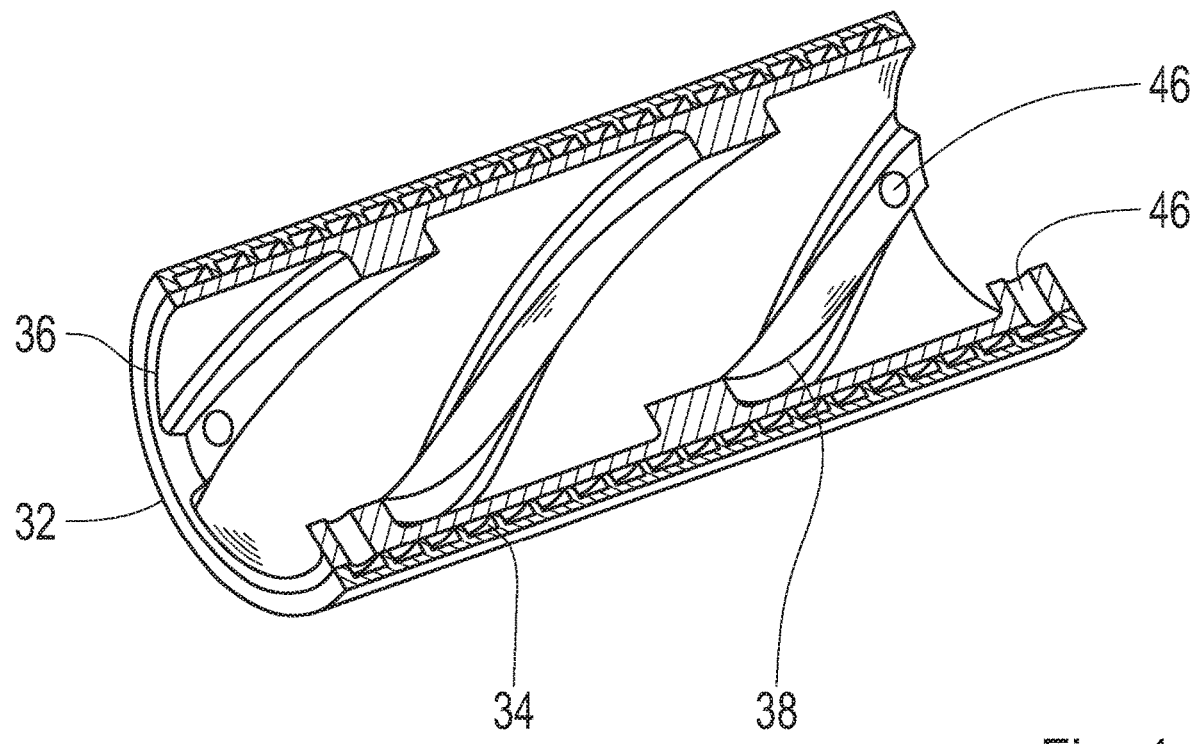
FIG. 4 shows a perspective technical section drawing of a first part of the heat sink and a second part of the heat sink.

In FIG. 4, a perspective drawing is shown as a section through the first part of the heat sink 32 and the second part of the heat sink 36. In this representation, bore holes 46 in a fin 38 of the second part of the heat sink 36 are apparent. Cooling fluid is introduced into the groove 34 of the first part of the heat sink 32 through these bore holes 46. The cooling fluid flows around the second part of the heat sink 36.

Figure 5:
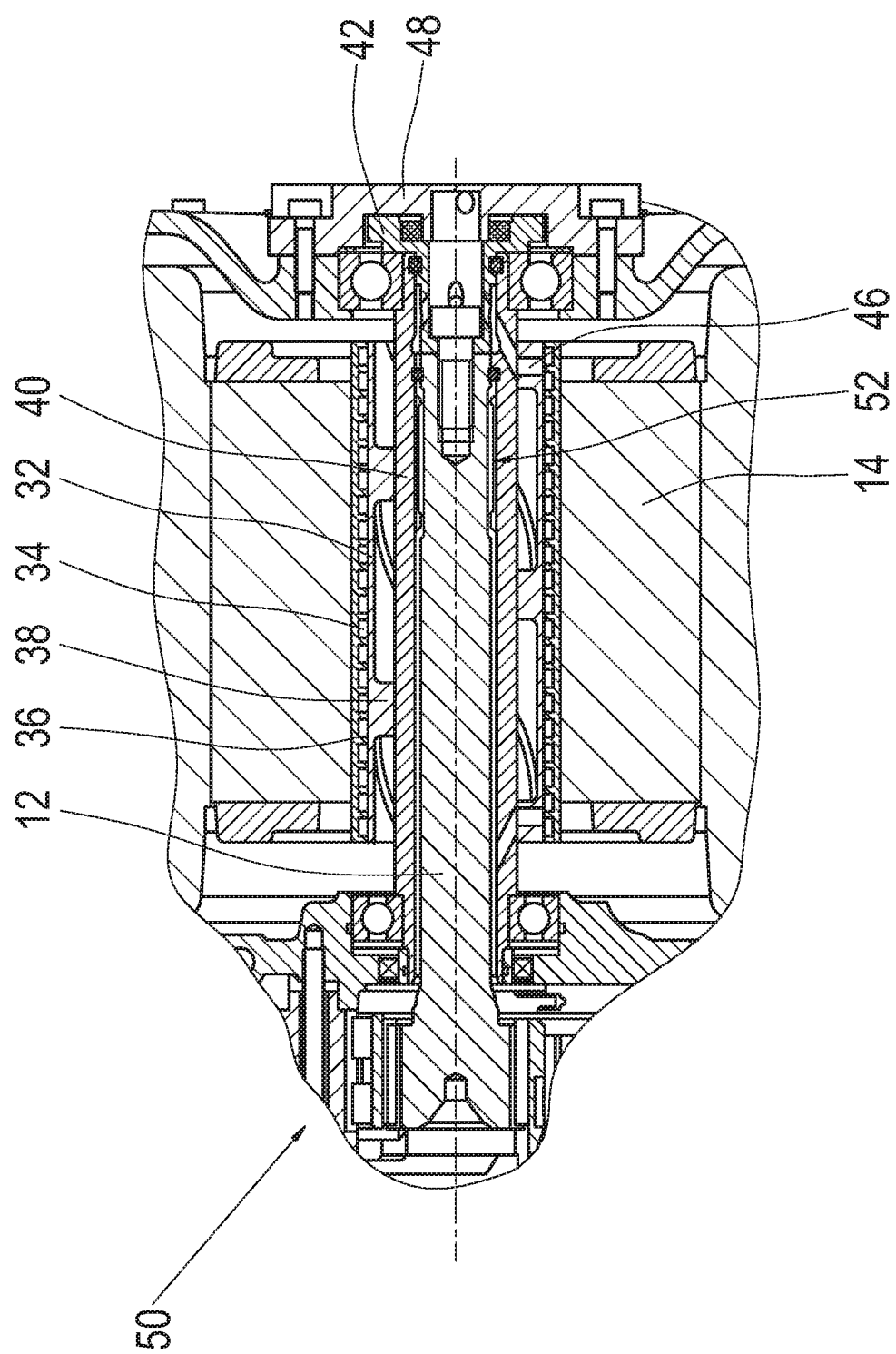
FIG. 5 shows a technical section drawing of the electric machine including a heat sink.

FIG. 5 shows a technical drawing of the electric machine 10 including the heat sink 30. During the operation of the electric machine 10, cooling fluid 28, preferably oil, is scavenged out of the fluid sump 22 by the fluid pump 24. The fluid pump 24 delivers the cooling fluid 28 through the lines 26 and hydraulic screw connections back into the heat sink 30. A seal, for example, a radial shaft seal or a combination of a sealing ring and a baffle plate, is located between the transmitter wheel 42, which rotates with the rotor 14 and the heat sink 30 of the electric machine 10, and a bearing cover 48.

The cooling fluid 28 flows through a bore hole in the bearing cover 48 into the interior of the transmitter wheel 42. From there, the cooling fluid is brought, via multiple bore holes in the transmitter wheel 42, into a gap between the heat sink 30 and the output shaft 12. From there, the cooling fluid 28 is delivered via a bore hole through the third part of the heat sink 36 and the second part of the heat sink 40 and, from there, through one further bore hole in the second part of the heat sink 36 into the groove 34. From there, the cooling fluid 28 flows through the helical groove 34. An efficient heat flux takes place from the electric machine 10 into the cooling fluid 28, since the contact length between the groove 34 and the electric machine 10 is very long due to the helical shape. At one end of the first part of the heat sink 32, the cooling fluid 28 flows again through a bore hole in the second part of the heat sink 36 and the third part of the heat sink 40 into a gap between the heat sink 30 and the output shaft 12 and, from there, finally, via the outflow back into the fluid sump 22.

The fins of the second part of the heat sink 36 function as a type of air swirler, which rotates with the rotor 14 of the electric machine 10 and, according to the rotational speed of the rotor shaft, conveys air through the heat sink 30. The air absorbs heat from the electric machine 10. The hot air, in turn, gives off heat to housing parts, for example, the cover of a motor housing for the electric machine 10. The motor housing is preferably provided with further cooling fins, or the like, in order to create a large surface and to be able to dissipate the heat, which has been given off by the air to the motor housing, more quickly to the surroundings.

It is understood that it could be provided, at the outflow, to no longer allow a transmission 50, which is operatively connected to the output shaft 12 of the electric machine 10, to churn, but rather to utilize the outflow for a toothing lubrication. These types of lubrication techniques are known, inter alia, as oil spray lubrication or forced oil lubrication. Preferably, the fluid sump is lowered in such a way that no hydraulic drag, or reduced hydraulic drag, results.

The heat sink 30 includes a connecting section 52 with a driving toothing, in order to enable a rotationally fixed connection to the output shaft 12. The connecting section 52 is formed on a radially internal section of the heat sink.

The invention was comprehensively described and explained with reference to the drawings and the description. The description and the explanation are to be understood as an example and are not to be understood as limiting. The invention is not limited to the disclosed embodiments. Other embodiments or variations result for a person skilled in the art within the scope of the utilization of the present invention and within the scope of a precise analysis of the drawings, the disclosure, and the following claims.

In the claims, the words "comprise" and "comprising" do not rule out the presence of further elements or steps. The indefinite article "a" does not rule out the presence of a plurality. The mere mention of a few measures in multiple various dependent claims is not to be understood to mean that a combination of these measures cannot also be advantageously utilized. Reference numbers in the claims are not to be understood as limiting. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS 10 electric machine
12 output shaft
14 rotor
16 stator
18 housing
20 system
22 fluid sump
24 fluid pump
26 line
28 cooling fluid
30 heat sink
32 first part of the heat sink
34 groove
36 second part of the heat sink
38 fin
40 third part of the heat sink
42 transmitter wheel
44 gap
46 bore hole
48 bearing cover
50 transmission
52 connecting section

The invention claimed is:

1. A heat sink (30) for cooling an electric machine (10), comprising:
a first heat sink part (32) shaped as a hollow cylinder, an inner lateral surface of the first heat sink part (32) comprising a groove (34) extending helically with respect to a central axis of the hollow cylinder;
a second heat sink part (36) shaped as a hollow cylinder, the second heat sink part (36) comprising a radially internal fin (38); and
a third heat sink part (40) in the form of a hollow cylinder, the third heat sink part (40) comprising a connecting section (52) configured for accommodating an output shaft (12) of the electric machine (10) in a rotationally fixed manner,
wherein the second heat sink part (36) is at least partially accommodated in the first heat sink part (32) such that a radially external surface of the second heat sink part (36) rests against the groove in order to seal the groove in a fluid-tight manner and form a helical fluid duct,
wherein the groove comprises an opening at each of end of the groove configured for exchanging a cooling fluid (28) in the helical fluid duct,
wherein the second heat sink part (36) is configured for arrangement, including the fin, on a radially external surface of the third heat sink part (40) in order to form one further fluid duct between a radially internal surface of the second heat sink part (36) and the radially external surface of the third heat sink part (40), and
wherein the first heat sink part (32) is configured for arrangement on a rotor (14) of the electric machine such that the heat sink is arranged between the rotor and the output shaft in a rotationally fixed manner to cool the electric machine and the output shaft of the electric machine.

2. The heat sink (30) of claim 1, wherein the fin (38) is helical, and the fin (38) is configured to generate an air flow through the heat sink during operation of the electric machine (10).

3. The heat sink (30) of claim 1, wherein:
the second heat sink part (36) and the third heat sink part (40) each comprise a respective bore hole (46) at axial end sections of the second and third heat sink parts (36, 40); and
the bore hole of the second heat sink part (36) is connected to the bore hole of the third heat sink part (40) and forms a duct, and the duct extends to the groove (34) in order to guide cooling fluid (28) to and away from the groove.

4. The heat sink (30) of claim 1, wherein:
the heat sink is a machined metal forging;
the first heat sink part (32) comprises one further groove (34) extending helically with respect to the central axis of the hollow cylinder; and
the second heat sink part (36) comprises one further fin (38).

5. The heat sink (30) of claim 1, wherein the third heat sink part (40) comprises a driving toothing on the connecting section (52) for rotationally fixing the third heat sink part (40) to the output shaft (12) of the electric machine (10).

6. The heat sink (30) of claim 1, wherein the first heat sink part (32), the second heat sink part (36), and the third heat sink part (40) are connected to one another with a press fit, friction welding, or a bonding.

7. The heat sink (30) of claim 1, wherein:
the third heat sink part (40) has an inner diameter that is greater than an outer diameter of the output shaft (12) of the electric machine (10); and
the output shaft of the electric machine and the third heat sink part (40) form a gap (44) for outflow of the cooling fluid.

8. The heat sink (30) of claim 7, wherein the gap (44) opens into a feed line to a fluid sump (22).

9. The heat sink (30) of claim 7, wherein a helical shape of the groove (34) is oriented in a main direction of rotation of the electric machine (10) to exert a suction effect on the cooling fluid (28) towards the gap (44).

10. An electric machine (10) comprising:
a stator (16);
a rotor (14); and
an output shaft (12) comprising the heat sink (30) of claim 1, wherein the heat sink is rotationally fixed to the rotor and the output shaft.

11. The electric machine (10) of claim 10, further comprising a transmitter wheel (42), the transmitter wheel connected to rotate together with the output shaft (12), the transmitter wheel comprising a bore hole for feeding the cooling fluid through the transmitter wheel to the heat sink (30).

12. The electric machine (10) of claim 10, wherein the heat sink (30) is rotationally fixed to the rotor (14) with a press fit.

13. The electric machine (10) of claim 10, wherein:
the output shaft (12) is configured for operatively connecting to a transmission (50);
the third heat sink part (40) has an inner diameter that is greater than an outer diameter of the output shaft (12); and
the output shaft and the third heat sink part (40) form a gap (44) for feeding the cooling fluid (28) to the transmission in order to lubricate and/or cool the transmission.

14. A system (20) for cooling an electric machine (10), comprising:
a fluid sump (22) for storing a cooling fluid (28);
the electric machine of claim 10; and a fluid pump (24) for delivering the cooling fluid in a fluid flow direction from the fluid sump to the heat sink (30) in order to form a cooling circuit.

15. The system (20) of claim 14, further comprising a heat exchanger for rejecting heat from the cooling fluid (28), the heat exchanger arranged between the fluid sump (22) and the fluid pump (24) in the fluid flow direction.

\* \* \* \* \*